United States Patent [19]

Müeller et al.

[11] 4,216,236

[45] Aug. 5, 1980

[54] INFANT MILK FORMULA AND PROCESS FOR ITS MANUFACTURE

[75] Inventors: Hans R. Müeller, St. Légier; Marie-Christine Secretin, Blonay, both of Switzerland

[73] Assignee: Societe d'Assistance Technique pour Produits Nestle S.A., Lausanne, Switzerland

[21] Appl. No.: 895,497

[22] Filed: Apr. 11, 1978

[30] Foreign Application Priority Data

Apr. 27, 1977 [CH] Switzerland .................. 5216/77

[51] Int. Cl.² ............................................. A23C 11/00
[52] U.S. Cl. ........................................ 426/72; 426/73;
426/74; 426/585; 426/590; 426/658; 426/801
[58] Field of Search .................. 426/72, 73, 74, 585,
426/588, 590, 801, 658

[56] References Cited

U.S. PATENT DOCUMENTS

| 2,659,676 | 11/1953 | Howard et al. | 426/74 X |
|---|---|---|---|
| 3,201,245 | 8/1965 | Clark et al. | 426/801 X |
| 3,320,072 | 5/1967 | Clark et al. | 426/801 X |
| 3,542,560 | 11/1970 | Tomarelli et al. | 426/801 |
| 3,649,295 | 3/1972 | Bernhart | 426/801 X |
| 3,896,240 | 7/1975 | Cruette et al. | 426/801 X |
| 3,901,979 | 8/1975 | Hagasawa et al. | 426/801 X |

Primary Examiner—Robert A. Yoncoskie
Attorney, Agent, or Firm—Watson, Leavenworth, Kelton & Taggart

[57] ABSTRACT

A food product for babies of low birth weight, particularly for premature babies and a process for its manufacture are disclosed. The product is characterized in that it contains the following substances per 100 parts by weight of dry material:

21-27 parts of lipids containing lactic fat, vegetable fat and medium chain triglycerides, the latter representing 30 to 50% by weight of the mixture of fats, 13-16 parts of proteins, at least 50% by weight of which are soluble proteins, 50-63 parts of carbohydrates, 1.5-2 parts of mineral salts and 1-3 parts of water.

9 Claims, 1 Drawing Figure

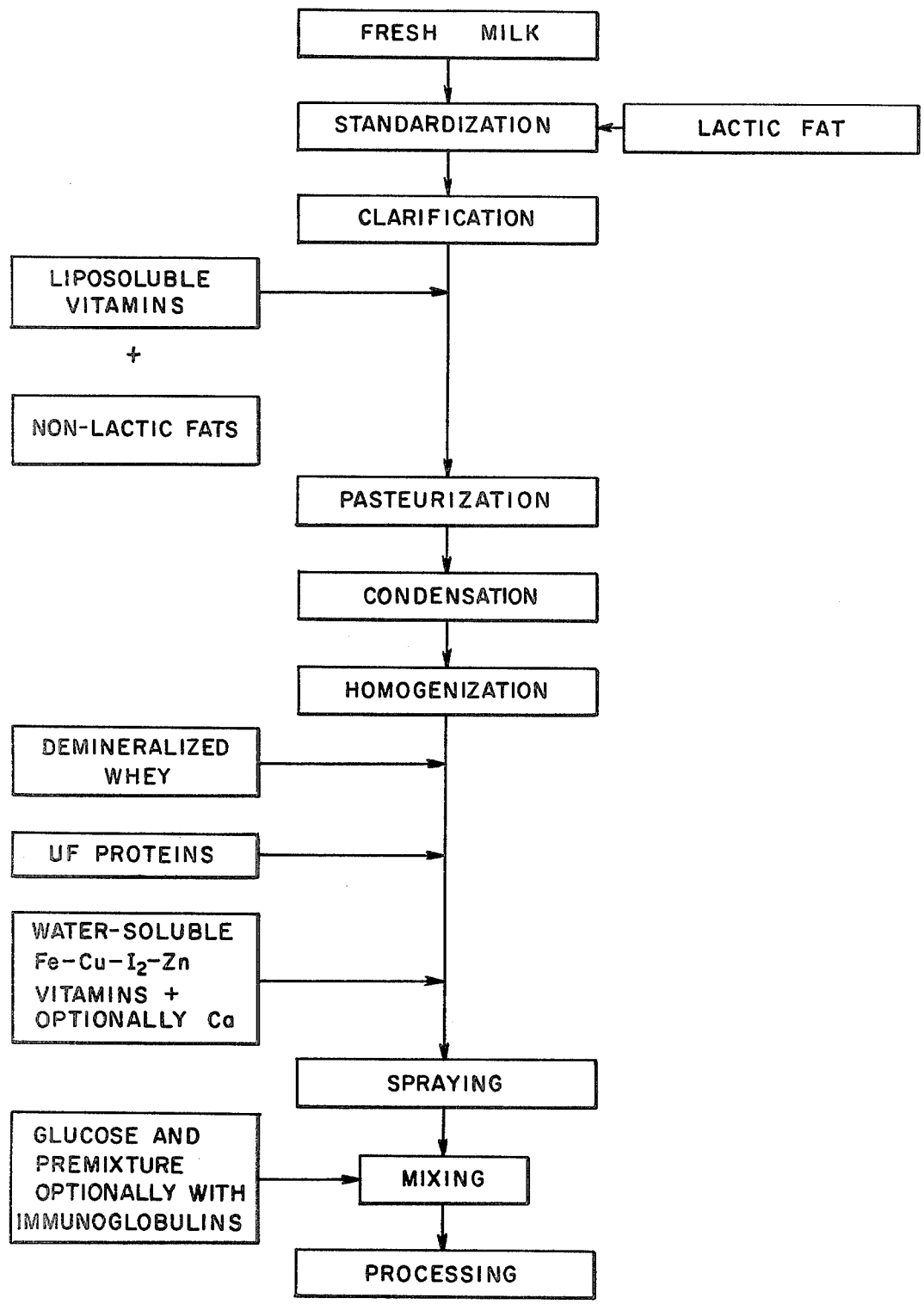

INFANT MILK FORMULA AND PROCESS FOR ITS MANUFACTURE

The present invention relates to a milk food for babies of low birth weight, that is to say new born babies who are delicate, dysmature or premature.

Numerous attempts have been made to manufacture dietetic products from animal milk which are capable of replacing the mother's milk. The milk of milk-giving females, in particular cow's milk, is frequently distinguished from mother's milk by a much higher protein and ash content as well as a much lower lactose content. As a result, animal milk is not adapted to the capabilities and needs of babies. In particular, the osmolar load is much too high owing to the high ash and protein content. In addition, the energy contribution is not guaranteed owing to the difficulty in absorbing lactic fats.

Thus, various processes have been developed, for manufacturing, from cow's milk, adapted or "humanised" products, the composition of which is as close as possible to that of mother's milk.

In one method, a "humanised" milk is prepared by partial demineralisation of whey over ion-exchange resins and addition to it of milk enriched in fats, mineral salts and vitamins.

In another method, electrodialysis of the milk serum and of the skimmed milk are carried out separately, the two products obtained are combined in a predetermined ratio and, by adding lactose, fat and mineral salts, a milk of almost identical composition to that of human's milk is obtained.

Other developments have attempted to solve more specific problems. For example, a liquid food has been proposed for babies, in particular premature babies or children of a diabetic mother, which is capable of satisfying their energy needs without causing hyperglycaemia, based on a maltosaccharide solution.

This research relates to nutritional physiology, in particular the adaptation of the food to mother's milk. Another aspect is the adaptation to mother's milk from the immunobiological point of view. Thus, a general method has been described for creating a dietetic product for new born and older babies involving the incorporation into the milk of immunising factors in order to allow these factors to be transferred into the baby's blood by oral ingestion without, however, showing the methods and results of passive immunisation of this type.

However, none of these attempts have led to a complete food capable of covering all the needs of babies of low birth weight. In fact, mother's milk is not the ideal food for the premature baby, mainly owing to its high lactose content, and "humanised" milks are not exactly suitable for this special physiological situation. Furthermore, although mother's milk contains an abundance of factors providing immunisation against enteropathogenic bacteria and viruses, for example Gram-negative bacteria of the *Escherichia coli* species which are responsible for gastro-enteritis accompanied by severe diarrhoea with dehydration in the case of the new born baby, in particular the secretory IgA, the known "humanised" cow's milks do not contain immunoglobulins the activity of which has been preserved during the technological process, and do not therefore protect the new born baby who is particularly delicate in the first months.

The food according to the invention proposes to satisfy in the best way the needs of the baby from the nutritional point of view without overloading its renal function. In an embodiment, it provides the new born baby with passive immunisation against pathogenic enterobacteria of the intestinal tract.

It is characterised in that it contains the following substances per 100 parts by weight of dry material:
21-27 parts of lipids containing lactic fat, vegetable fat and medium chain triglycerides, the latter representing 30 to 50% by weight of the mixture of fats,
13-16 parts of proteins, at least 50% by weight of which are soluble proteins,
50 to 63 parts of carbohydrates,
1.5 to 2 parts of mineral salts and
1-3 parts of water.

The food preferably contains per 100 g of dry material at least 320 mg of calcium,
at most 600 mg of potassium,
at most 150 mg of sodium,
a sufficient quantity of phosphorus for the calcium phosphorus ratio by weight to be at least 1.4, as well as minimum quantities of the vitamins and oligo-elements listed below

| | |
|---|---|
| iron | 6.0 mg |
| copper | 0.3 mg |
| zinc | 1.8 mg |
| iodine | 25 µg |
| folic acid | 80 µg |
| vitamin C | 200 mg |
| vitamin A | 1300 I.U. |
| vitamin E | 10 mg |
| vitamin $B_1$ | 0.35 mg |
| vitamin $B_2$ | 0.5 mg |
| vitamin $B_6$ | 0.9 mg |
| vitamin $B_{12}$ | 1.7 µg |
| nicotinamide | 5.2 mg |
| calcium pantothenate | 2.6 mg |

The mixture of fats preferably contains, by weight, 45 to 55% of lactic fat, 9 to 15% of a vegetable oil, for example corn oil, and 35 to 45% of medium chain triglycerides, linoleic acid representing 8 to 13% of total fatty acids. This mixture allows excellent assimilation which is at least equivalent to that of mother's milk.

The amount and the nature of the proteins are preferably selected so as to afford a high nutritive value while at the same time taking into consideration the immaturity of the new born baby's, in particular the premature baby's, renal function, because the proteins make a significant contribution to the renal osmolar load. The proportion of proteins is thus advantageously less than 15 parts by weight and the mixture of proteins contains, by weight, 27 to 33 parts of casein per 67 to 73 parts of soluble proteins. The contribution of about 3 g of proteins per 100 cal is the optimum for gain in weight (on average 7.5 to 12 g/kg/day) and in length and for normalishing the proportion of serum proteins in premature babies. Unlike "humanised" milks which give values similar to those observed in pre-kwashiokor conditions, the Whitehead index and the alanine/valine ratio are normalised rapidly. The soluble proteins which are essentially in a non-denatured state have a high nutritional value (Protein Efficiency Ratio of between 3.4 and 3.8) owing to their amino acid composition and in particular to the contribution of cystine which allows optimum utilisation of them, as testified by the high proportion of plasma albumin (higher than that of a milk which is richer in proteins but whose proteins are those of unmodified cow's milk and the coefficient of nitrogenous retention.

The amount of proteins is perfectly compatible with the new born baby's renal and metabolic functions as testified by the absence of hypertyrosinaemia even without enriching the diet in vitamin C, by the urinary osmolarity of about 200 mOsmoles per liter as well as the basic equilibrium, for example, the pH of the blood remaining, between 7.3 and 7.5.

In a particular embodiment, a proportion of the soluble proteins is formed by a concentrate of active (IgG) non-denatured immunoglobulins. These globulins are preferably derived from the milk of a milk-giving female which has been hyperimmunised by any suitable method. As the cow is used as productive animal, these are mainly IgG (particularly $IgG_1$) while the Ig of mother's milk are composed essentially of IgA.

All types of antibodies may thus be produced and incorporated in the food, for example in the form of a protein concentrate rich in Ig obtained according to Swiss patent application No. 4679/77. Antibodies which are active against pathogenic enterobacteria, in particular against *E. coli*, are preferably used. The food is advantageously enriched Ig which are active against *E. coli* at a level corresponding to 0.8 to 6 g, preferably 1 to 3 g of Ig concentrate per 100 g of dry material.

Clearly the antibodies may be added to the powder prior to processing or, as a variation, to the reconstituted milk prior to use.

The carbohydrates are composed of lactose and of a glucose donor, i.e. a material capable of being metabolised rapidly into glucose, glucose being preferred, the lactose content of the mixure preferably being lower than 75%. This mixture advantageously contains, by weight, 25 to 29% of glucose and 71 to 75% of lactose. It takes into consideration, the prematures baby's temporary inability to tolerate lactose, glucose providing an immediate source.

The amount of mineral salts responsible for a large proportion of the renal load is kept as low as possible, urinary osmolarity being very low, for example 18 to 22 mOsmoles/kg/day, calcium, however, representing a high proportion of the mineral salts present.

Among the vitamins, the vitamin C contribution is regulated to avoid any risk of hypertyrosinaemia while the addition of folic acid allows the content of it to be increased in the blood. The food may also contain, in addition to the vitamins already mentioned, vitamin D in a proportion of 1500 to 2500 I.U. per 100 g of powder.

Other trace elements, for example zinc, may be incorporated in it.

The invention also relates to a process for the preparation of the milk food defined above from fresh milk, lactic fat, non-lactic fat, demineralised whey, ultra-filtered whey proteins, mineral salts, vitamins and trace elements, characterised by the following stages:

Fresh milk is clarified and lactic fat is then added to the clarified fresh milk,
a mixture of non-lactic fats is added to it
the mixture obtained is pasteurised, concentrated, homogenized, cooled, practically demineralised whey and essentially non-denatured soluble proteins obtained by ultrafiltration of whey are added to it, the mixture is preheated and dried under conditions avoiding denaturation of the proteins, the powder obtained is mixed dry with an anhydrous glucose donor and the product is processed out of contact with oxygen.

The different stages of the process are represented by the diagram in the attached drawing.

Although it is preferable to add water soluble vitamins and calcium after addition of the demineralised whey and ultrafiltered proteins, they may be added prior to pasteurisation as a variation.

If the fresh milk does not contain enough calcium, it is advantageously added in the form of citrate or carbonate, the citrate being preferred.

The liposoluble vitamins are advantageously added to the mixture of non-lactic fats.

The practically demineralised whey is such that it contains soluble proteins in an essentially non-denatured state and the majority of the electrolytes are removed.

It is advantageously used in the form of a powder obtained from sweet whey which has been demineralised to a substantial degree, for example by ion-exchange resins, reverse osmosis or electrodialysis (ion exchange and electrodialysis being preferred), concentration and drying under conditions which avoid damage to the proteins and result on a powder which is bacteriologically acceptable and non-hygroscopic.

The soluble proteins are obtained by ultra-filtration of whey under a pressure generally below 7 bars over a membrane having a cutting zone, i.e., the ability to retain compounds of a molecular weight between $10^3$ and $5.10^5$ and selected for having a high transfer flow and for being permeable to lactic acid, lactose, ash and short polypeptide chains and impermeable to soluble proteins. The temperature selected avoids oxidation and thermal degradation of the product and reduces the risks of structural changes. On the other hand, the ionic strength and pH remain constant in the concentrate. The soluble proteins may therefore be concentrated without concentrating the lactose and the ash. If necessary, the concentrates may be washed with water, i.e. diafiltration may be carried out and followed by evaporation. The product is then subjected to a thermal treatment and drying under conditions avoiding damage to the proteins and eliminating the yeasts, moulds and coliform bacteria.

The powder obtained preferably has the following characteristics:

| | |
|---|---|
| proteins (total nitrogen × 6.38) | minimum 80% |
| moisture | maximum 5% |
| fat | maximum 7% |
| lactose | maximum 4% |
| ash | maximum 2% |
| degree of denaturation of proteins | maximum 30% |

It is certain that the methods of obtaining, the order of introduction or the proportions of the different ingredients entering the composition of the milk food may be modified when carrying out the process without departing from the scope of the invention.

The following examples, in which the quantities and proportions are by weight unless otherwise stated, illustrate the manner in which the invention may be carried out.

EXAMPLE 1

Fresh milk is clarified by centrifugation and is adjusted so as to obtain a quantity of cow's milk having a content of lactic fat of 113 kg per 145 kg of fat-free dry matter. This adjustment is carried out by mixing measured quantities of skimmed milk or whole milk and cream, the composition of which has been determined beforehand. 24 kg of corn oil containing liposoluble vitamins and 96 kg of medium chain triglycerides obtained from coconut oil are then added directly into the line, preferably by means of a piston pump. As a variation, oil and triglycerides may be added to the tank containing standardised milk providing that the mixer is strong enough to prevent the fat from rising and to homogenize the mass well. The mixture is then subjected to pasteurisation for a short period, at most 60 seconds at 110° C. with the aid of a tubular apparatus, and is then concentrated in batches or continuously, for example in a falling film evaporator to dry matter content of 30 to 34%. The concentrate is then transferred into a buffer tank, homogenised at a temperature of 50° C. under a pressure of 100 to 150 kg/cm$^2$ and cooled in a buffer tank at a temperature of 8° C. 381 kg of demineralised whey powder, 50 kg of ultrafiltered whey proteins and water soluble vitamins are then added.

Dissolution is effected in a vat provided with a turbomixer (1500 r.p.m.), the demineralised whey powder and the ultra-filtered proteins being introduced by means of a vibrating or screw feeder so as to obtain a final mixture having a dry matter content of 40 to 45%.

The demineralised whey is obtained by electrodialysis or by passage over ion-exchange resin, or else by combining these two techniques, that is to say electrodialysis followed by ion exchange then drying. The powder has the following average composition per 100 parts:

| | |
|---|---|
| water | 3.30 |
| fat | 0.80 |
| proteins (total nitrogen × 6.38) | 12.00 |
| lactose | 83.10 |
| ash | 0.75 |
| calcium citrate | 0.05 |

The ultra-filtered whey proteins are obtained by ultra-filtration of whey and drying. They have a low degree of denaturation and the following average composition per 100 parts:

| | |
|---|---|
| water | 4.6 |
| fat | 6.5 |
| proteins (total nitrogen × 6.38) | 81.0 |
| lactose | 3.9 |
| ash | 1.6 |
| miscellaneous | 2.4 |

5 kg of calcium (in the form of colloidal calcium citrate, optionally in the form of calcium carbonate) and small quantities of iron (in the form of ferric ammonium citrate), copper (in the form of copper lysine complex) and iodine (in the form of potassium iodide) are also added to the mixing vat with a stirring time of 10 to 15 minutes.

The mixture obtained is then pasteurised in a tubular or plate-type apparatus at a temperature of 70° to 80° C. without a dwell period so as to denature as little as possible the serum proteins of the demineralised whey which are very sensitive to heat. The product is then spray-dried at low or high pressure in a tower, the liquid to be dried being dispersed in the form of fine droplets in a stream of hot air at a temperature of below 380° C., and having a dry matter content of 35 to 45%.

156 kg of anhydrous glucose is added to the cooled powder obtained by dry blending in a mixer. The product is then filled into air-tight containers which are gassed with nitrogen or a mixture of nitrogen and carbon dioxide.

A powder having the following composition per 100 g is thus obtained:

| | |
|---|---|
| Proteins | 14.4 g of which 4.4 g are casein and 10.0 g are soluble proteins |
| lipids | 24.0 g |
| carbohydrates | 56.9 g |
| ash | 1.7 g |
| water | 3.0 g |
| calcium | 350 mg |
| phosphorus | 200 mg |
| potassium | 370 mg |
| sodium | 103 mg | as well as minimum quantities of the vitamins and trace elements listed below:

| | |
|---|---|
| iron | 6.0 mg |
| copper | 0.3 mg |
| zinc | 1.8 mg |
| iodine | 25 μg |
| folic acid | 80 μg |
| vitamin C | 200 mg |
| vitamin E | 10 mg |
| vitamin $B_1$ | 0.35 mg |
| vitamin $B_2$ | 0.5 mg |
| vitamin $B_6$ | 0.9 mg |
| vitamin $B_{12}$ | 1.7 μg |
| nicotinamide | 5.2 mg |
| calcium pantothenate | 2.6 mg |

The product is reconstituted by dissolving 15 g of powder in 90 ml of water.

EXAMPLE 2

1 kg of Ig concentrate prepared according to Example 2 or 4 or 2 kg of powder prepared according to Example 3 of Swiss patent application No. 4679/77 (corresponding to U.S. patent application Ser. No. 889,220, filed Mar. 23, 1978) is thoroughly mixed with 15 kg of glucose. This product is then mixed in a homogeneous manner with 84 kg of powder obtained according to Example 1 and is processed under sterile conditions. an isocaloric food (140 cal/kg/day) provides 250 mg of Ig/kg/day concentrate prepared according to Example 2 or 4, or 500 mg of Ig/kg/day concentrate prepared according to Example 3 of Swiss patent application No. 4679/77 (corresponding to U.S. patent application Ser. No. 889,220, filed Mar. 23, 1978).

We claim:

1. A food product for babies of low birth weight, particularly for premature babies, comprising the following substances per 100 parts by weight of dry material:

21-27 parts of lipids containing, by weight 45 to 50% of lactic fat, 9 to 15% of vegetable oil, and 35 to 45% of medium chain triglycerides, linoleic acid representing 8 to 13% of the total fatty acids, 13-16 parts of milk proteins, at least 50% by weight of which are soluble proteins, 50-63 parts of carbohydrate sugars consisting of a mixture of lactose and of a glucose donor other than lactose, 1.5-2 parts of mineral salts and 1-3 parts of water.

2. A food product according to claim 1, wherein the mineral salts comprise, per 100 g of dry material:
at least 320 mg of calcium,
at most 600 mg of potassium,
at most 150 mg of sodium and
a sufficient quantity of phosphorus for the ratio by weight of calcium to phosphorus to be at least 1.4,
as well as minimum quantities of the vitamins and trace-elements listed below:

| | |
|---|---|
| iron | 6.0 mg |
| copper | 0.3 mg |
| zinc | 1.8 mg |
| iodine | 25 µg |
| folic acid | 80 µg |
| vitamin C | 200 mg |
| vitamin A | 1300 I.U. |
| vitamin E | 10 mg |
| vitamin $B_1$ | 0.35 mg |
| vitamin $B_2$ | 0.5 mg |
| vitamin $B_6$ | 0.9 mg |
| vitamin $B_{12}$ | 1.7 µg |
| nicotinamide | 5.2 mg |
| calcium pantothenate | 2.6 mg |

3. A food according to claim 1, wherein the proportion of proteins is less than 15 parts by weight and that the protein mixture contains, by weight, 27 to 33% of casein per 67 to 73% of soluble proteins.

4. A food according to claim 1, wherein it additionally contains active anti-coliform immunoglobulins in the form of a protein concentrate containing 25 to 40% by weight of immunoglobulins in an amount of 0.8 to 6 parts of concentrate per 100 parts of dry material.

5. A food according to claim 1, wherein the carbohydrates contain, by weight, 25 to 29% of glucose per 71 to 75% of lactose.

6. A food according to claim 1, wherein it additionally contains 1500 to 2000 I.U. of vitamin D per 100 g of dry material.

7. A process for the production of a food product for babies of low birth weight, comprising the steps of:
(a) clarifying fresh milk;
(b) adding lactic fat to the clarified fresh milk;
(c) further adding non-lactic fats to the mixture of clarified fresh milk and lactic fat;
(d) pasteurizing, concentrating, homogenizing and cooling the resulting milk mixture;
(e) adding substantially demineralized whey and essentially non-denatured ultrafiltered soluble whey proteins to the milk mixture;
(f) preheating and drying the milk mixture under conditions which do not denature the proteins to obtain a powder;
(g) mixing the powder with an anhydrous glucose donor to form the food product; and then
(h) storing the resultant food product in the absence of oxygen wherein the said resultant food product comprises the following substances per 100 parts by weight of dry material:
21–27 parts of lipids containing, by weight, 45 to 50% of lactic fat, 9 to 15% of vegetable fat and 35 to 45% of medium chain triglycerides, linoleic acid representing 8 to 13% of the total fatty acids,
13–16 parts of milk proteins, at least 50% by weight of which are soluble proteins,
50–63 parts of carbohydrate sugars consisting of a mixture of lactose and of a glucose donor other than lactose,
1.5–2 parts of mineral salt and
1–3 parts of water.

8. A process according to claim 7, wherein liposoluble vitamins are added by dissolution in the mixture of non-lactic fats.

9. A process according to claim 7, wherein watersoluble vitamins, trace-elements and mineral salts are added after addition of the demineralised whey and the ultrafiltrated proteins.

UNITED STATES PATENT AND TRADEMARK OFFICE
CERTIFICATE OF CORRECTION

PATENT NO. : 4,216,236

DATED : August 5, 1980

INVENTOR(S) : Hans R. Mueller and Marie-Christine Secretin

It is certified that error appears in the above-identified patent and that said Letters Patent are hereby corrected as shown below:

```
Col. 1, line 6, "whe" should read --who--.
Col. 2, line 58, "malishing" should read --malising--.
Col. 3, line 2, "milk" should read --milk)--.
Col. 3, line 26, before the word "Ig", insert --in--.
Col. 4, line 28, "compounds" should read --compounds,--.
Col. 6, line 47, "an" should read --An--.
Claim 1, line 5, "by weight" should read --by weight,--.
Claim 7, line 30, "salt" should read --salts--.
```

Signed and Sealed this

Twenty-eighth Day of October 1980

[SEAL]

Attest:

SIDNEY A. DIAMOND

Attesting Officer

Commissioner of Patents and Trademarks